United States Patent
Smith et al.

(10) Patent No.: US 6,585,849 B2
(45) Date of Patent: Jul. 1, 2003

(54) METHOD OF MAKING LIQUID CRYSTAL DISPLAY HAVING A DIELECTRIC ADHESIVE LAYER FOR LAMINATING A LIQUID CRYSTAL LAYER

(75) Inventors: Thomas M. Smith, Spencerport, NY (US); Stanley W. Stephenson, Spencerport, NY (US); John I. Kilburn, Hilton, NY (US); John W. Boettcher, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 45 days.

(21) Appl. No.: 09/915,831

(22) Filed: Jul. 26, 2001

(65) Prior Publication Data

US 2003/0019575 A1 Jan. 30, 2003

(51) Int. Cl.[7] .............................................. G02F 1/1333
(52) U.S. Cl. ........................................ 156/326; 349/187
(58) Field of Search ..................... 156/326; 349/122, 349/138, 187; 428/1.5

(56) References Cited

U.S. PATENT DOCUMENTS

| 3,816,786 | A | | 6/1974 | Churchill et al. |
| 4,435,047 | A | | 3/1984 | Fergason |
| 5,223,959 | A | | 6/1993 | Wu et al. |
| 5,289,300 | A | | 2/1994 | Yamazaki et al. |
| 5,437,811 | A | | 8/1995 | Doane et al. |
| 5,453,863 | A | | 9/1995 | West et al. |
| 5,671,030 | A | * | 9/1997 | Ohnuma et al. ............ 349/106 |
| 5,695,682 | A | | 12/1997 | Doane et al. |
| 6,190,774 | B1 | * | 2/2001 | Tanaka et al. .............. 428/407 |
| 6,392,736 | B1 | * | 5/2002 | Furukawa et al. .......... 349/158 |
| 2003/0011868 | A1 | * | 1/2003 | Zehner et al. .............. 359/296 |

FOREIGN PATENT DOCUMENTS

WO    WO 97/04398    2/1997

* cited by examiner

Primary Examiner—Michael W. Ball
Assistant Examiner—John T. Haran
(74) Attorney, Agent, or Firm—Raymond L. Owens

(57) ABSTRACT

A method of making a liquid crystal display, including the steps of providing a substrate; providing a first electrode over the substrate; coating the first electrode with aqueous dispersed material which when dried provides a protective dielectric layer over the first electrode; coating the dielectric layer with liquid crystal bearing material and drying such liquid crystal bearing material, providing a second substrate having a second electrode, coating the second electrode with a dielectric adhesive layer; and laminating the coated second electrode to the liquid crystal bearing material by means of the dielectric adhesive material.

11 Claims, 5 Drawing Sheets

METHOD OF MAKING LIQUID CRYSTAL DISPLAY HAVING A DIELECTRIC ADHESIVE LAYER FOR LAMINATING A LIQUID CRYSTAL LAYER

CROSS REFERENCE TO RELATED APPLICATIONS

Reference is made to commonly assigned U.S. patent application Ser. No. 09/379,776, filed Aug. 24, 1999 entitled "Forming A Display Having Conductive Image Areas Over A Light Modulating Layer" by Dwight J. Petruchik et al., U.S. patent application Ser. No. 09/723,389, filed Nov. 28, 2000, entitled "Unipolar Drive for Cholesteric Liquid Crystal Displays" by David M. Johnson et al., U.S. patent application Ser. No. 09/915,441, filed concurrently herewith, entitled "A Dielectric Layer For Dispersed Liquid Crystal Layer" by Stephenson et al and U.S. patent application Ser. No. 09/915,614, filed concurrently herewith, entitled "Making a Liquid Crystal Display Using Heat and Pressure Lamination of Liquid Crystal Coating" by Smith et al, the disclosures of which are incorporated herein by reference.

FIELD OF THE INVENTION

The present invention relates to a method of making a liquid crystal display having a dielectric adhesive layer used in the lamination process.

BACKGROUND OF THE INVENTION

Currently, information is displayed using assembled sheets of paper carrying permanent inks or displayed on electronically modulated surfaces such as cathode ray displays or liquid crystal displays. Other sheet materials can carry magnetically writable areas to carry ticketing or financial information, however magnetically written data is not visible.

A structure is disclosed in PCT/WO 97/04398, entitled "Electronic Book With Multiple Display Pages" which is a thorough recitation of the art of thin, electronically written display technologies. Disclosed is the assembling of multiple display sheets that are bound into a "book", each sheet is arranged to be individually addressed. The patent recites prior art in forming thin, electronically written pages, including flexible sheets, image modulating material formed from a bi-stable liquid crystal system, and thin metallic conductor lines on each page.

Fabrication of flexible, electronically written display sheets are disclosed in U.S. Pat. No. 4,435,047. A first sheet has transparent ITO conductive areas and a second sheet has electrically conductive inks printed on display areas. The sheets can be glass, but in practice have been formed of Mylar polyester. A dispersion of liquid crystal material in a binder is coated on the first sheet, and the second sheet is bonded to the liquid crystal material. Electrical potential applied to opposing conductive areas operate on the liquid crystal material to expose display areas. The display uses nematic liquid crystal material which ceases to present an image when de-energized.

U.S. Pat. No. 5,223,959 discloses a plurality of polymer dispersed liquid crystal materials, each having a different red, green or blue dye material. Differing electrical signals to common electrodes operate on each of the materials to control the state of each type of dyed liquid crystal material. The patent requires the use of conventional nematic liquid crystals with a dye to absorb light. The droplets are chemically treated to be stable in either a clear or a light absorbing state. The invention also requires materials having different response times to electrical signals. The device must be continually driven so that the human eye perceives complementary colors. This arrangement has the disadvantage of requiring continuous, high speed electrical drive because the materials do not maintain their state. The material must be driven to achieve a neutral color density.

U.S. Pat. No. 5,437,811 discloses a light-modulating cell having a polymer dispersed chiral nematic liquid crystal. The chiral nematic liquid crystal has the property of being driven between a planar state reflecting a specific visible wavelength of light and a light scattering focal-conic state. Said structure has the capacity of maintaining one of the given states in the absence of an electric field.

U.S. Pat. No. 3,816,786 discloses droplets of cholesteric liquid crystal in a polymer matrix responsive to an electric field. The electrodes in the patent can be transparent or non-transparent and formed of various metals or graphite. It is disclosed that one electrode must be light absorbing and it is suggested that the light absorbing electrode be prepared from paints contains conductive material such as carbon.

U.S. Pat. No. 5,289,300 discusses forming a conductive layer over a liquid crystal coating to form a second conductor. The description of the preferred embodiment discloses Indium-Tin-Oxide (ITO) over a liquid crystal dispersion to create a transparent electrode.

Prior art discloses the use of dielectric barrier layers formed over ITO conductors. The dielectric layer protects the ITO transparent conductor from damage from electrochemical interaction with the light modulating material. The protective layers are typically formed by vacuum sputtering silicon dioxide over the ITO conductors. The vacuum forming process is slow and expensive.

SUMMARY OF THE INVENTION

It is an object of this invention to provide a highly effective dielectric adhesive layer over an electrode used in the lamination of polymer dispersed liquid crystal displays.

This object is achieved in a method of making a liquid crystal display, comprising the steps of:

(a) providing a substrate;

(b) providing a first electrode over the substrate;

(c) coating the first electrode with aqueous dispersed material which when dried provides a dielectric layer over the first electrode;

(d) coating the dielectric layer with liquid crystal bearing material and drying such liquid crystal bearing material;

(e) providing a second, separate substrate;

(f) providing a second electrode over the second substrate;

(g) coating the second electrode with a thermoplastic, dielectric adhesive layer; and (h) subsequently laminating this second structure to the dried liquid crystal bearing material by means of the dielectric adhesive material.

The invention provides an inexpensive, transparent, colorless, dielectric adhesive layer between a field carrying electrode and the dried liquid crystal bearing material. This adhesive layer can be coated from water or organic solvents. Such dielectric adhesive layers provide an excellent bond between the liquid crystal layer and the conductive support, typically exceeding the cohesive integrity of the liquid crystal layer.

The present invention provides a dielectric adhesive layer over a conductive layer using simple, inexpensive coating techniques. Such coatings permit the fabrication of electronic privacy screens having long life and durability.

DETAILED DESCRIPTION OF THE PREFERRED EMBODIMENT

Figure 1:
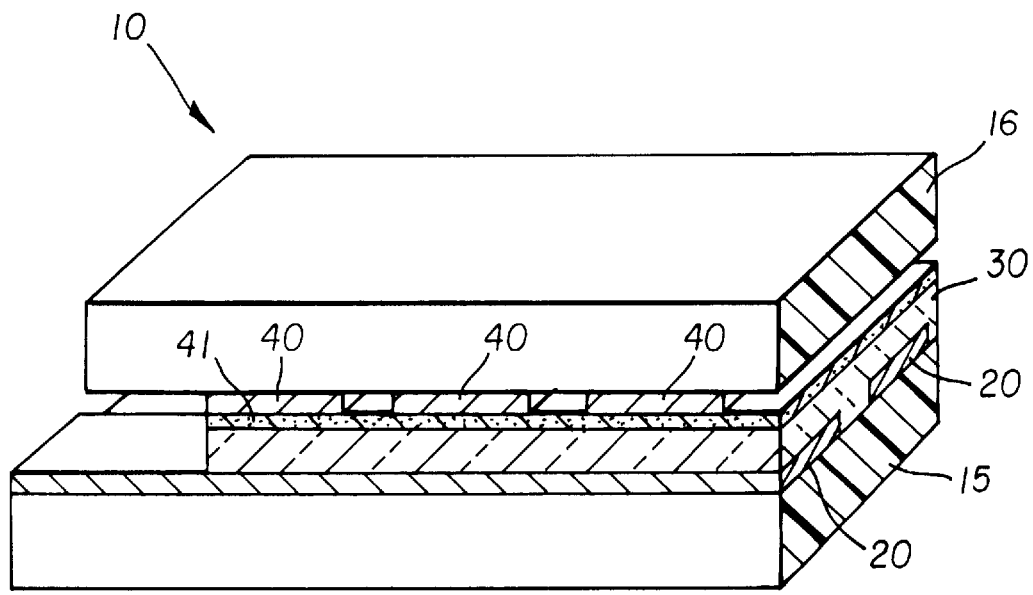
FIG. 1 is a sectional view of a sheet having a coated liquid crystal in accordance with the present invention.

FIG. 1 is an isometric partial view of a new structure for a liquid crystal display shown as a sheet 10 made in accordance with the invention. It will be understood that other forms of media such as a more permanent display can also be used in accordance with the present invention. Sheet 10 includes a flexible substrate 15, which is a thin transparent polymeric material, such as Kodak Estar film base formed of polyester plastic that has a thickness of between 20 and 200 microns. In an exemplary embodiment, substrate 15 can be a 125-micron thick sheet of polyester film base. Other polymers, such as transparent polycarbonate, can also be used.

First electrode 20 is formed over substrate 15. First electrode 20 can be tin oxide or indium tin oxide (ITO), with ITO being the preferred material. Typically the material of first electrode 20 is sputtered as a layer over substrate 15 having a resistance of less than 250 ohms per square. In certain applications, the sputtered layer is patterned in any well-known manner. Alternatively, first electrode 20 can be an opaque electrical conductor material such as copper, aluminum or nickel. If first electrode 20 is an opaque metal, the metal can be a metal oxide to create light absorbing first electrode 20. First electrode 20 can be patterned by conventional lithographic or laser etching means.

A light-modulating layer 30 that preferably is a polymer dispersed liquid crystal layer overlays first patterned electrode 20. This light modulating layer 30 is formed by coating liquid crystal bearing material and drying such liquid crystal bearing material. In a first case, the liquid crystal material is a nematic liquid crystal. Nematic liquid crystal materials can be Merck BL12, BL48, available from EM Industries of Hawthorne, N.Y. Such materials have high anisotropy indices of diffraction, which can act as a light diffusing surface in the absence of an electric field and as a transparent sheet 10 in the presence of an electric field.

In a second case the liquid crystal is a cholesteric liquid crystal, having peak reflection from the infrared through the visible spectrum. Application of electrical fields of various intensities and duration can drive a chiral nematic material (cholesteric) into a reflective, a transmissive state or an intermediate state. These materials have the advantage of maintaining a given state indefinitely after the field is removed. Cholesteric liquid crystal materials can be Merck BL112, BL118 or BL126, available from EM Industries of Hawthorne, N.Y.

Second electrode 40 is formed over second substrate 16. Second substrate 16 can be formed of the same material and way as the first substrate 15 is formed. Second electrode 40 receives a dielectric adhesive layer 41. Second electrode 40 should have sufficient conductivity to carry a field across light modulating layer 30. Second electrode 40 can be formed in a vacuum environment using materials such as aluminum, tin, silver, platinum, carbon, tungsten, molybdenum, indium or combinations thereof. Oxides of said metals can be used provide a dark second electrode 40. The metal material can be excited by energy from resistance heating, cathode arc, electron beam, sputtering or magnetron excitation. Tin oxide or indium tin oxide coatings permit second electrode 40 to be transparent.

The dielectric adhesive layer 41 is used to subsequently bond the second electrode 40 to the light modulating layer 30. Conventional lamination techniques involving heat and pressure are employed to achieve a permanent durable bond. Certain thermoplastic polyesters, such as VITEL 1200 and 3200 resins from Bostik Corp., polyurethanes, such as MORTHANE CA-100 from Morton International, polyamides, such as UNIREZ 2215 from Union Camp Corp., polyvinyl butyral, such as BUTVAR B-76 from Monsanto, and poly(butyl methacrylate), such as ELVACITE 2044 from ICI Acrylics Inc. will provide a substantial bond between the electrically conductive and light-modulating layers. This dielectric adhesive layer 41 can be coated from common organic solvents at a dry thickness of one to three microns.

The dielectric adhesive layer 41 can also be coated from an aqueous solution or dispersion. Polyvinyl alcohol, such as AIRVOL 425 or MM-51 from Air Products, poly(acrylic acid), and poly(methyl vinyl ether/maleic anhydride), such as GANTREZ AN-119 from GAF Corp. can be dissolved in water, subsequently coated over the second electrode 40, dried to a thickness of one to three microns and laminated to the light-modulating layer 30. Aqueous dispersions of certain polyamides, such as MICROMID 142LTL from Arizona Chemical, polyesters, such as AQ 29D from Eastman Chemical Products Inc., styrene/butadiene copolymers, such as TYLAC 68219-00 from Reichhold Chemicals, and acrylic/styrene copolymers such as RayTech 49 and RayKote 234L from Specialty Polymers Inc. can also be utilized as a dielectric adhesive layer as previously described.

Figure 2:
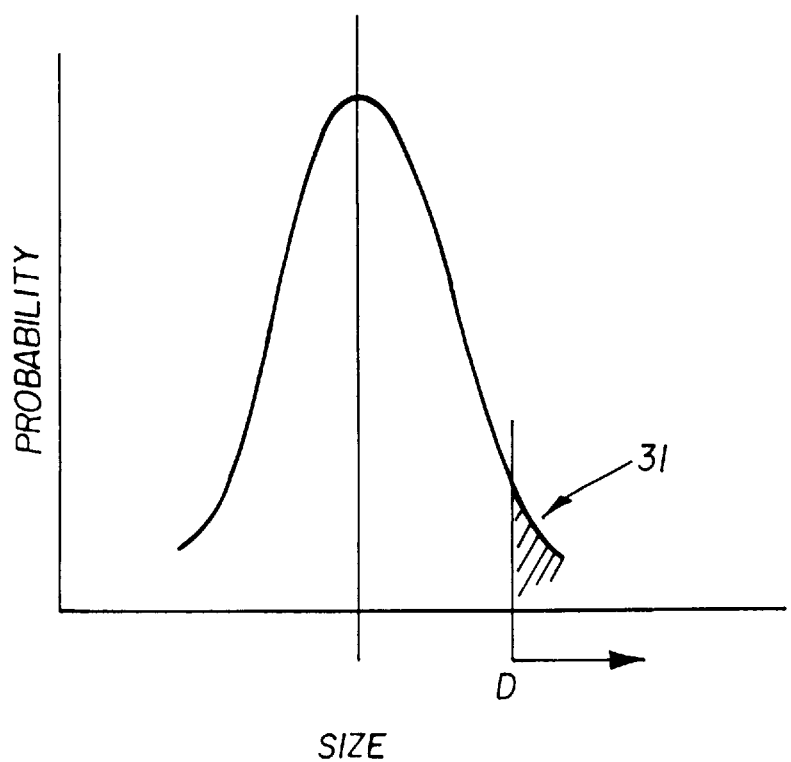
FIG. 2 is a plot of a distribution of domain size for aqueous dispersed liquid crystal.

The dispersion of liquid crystals in aqueous suspension is done in any conventional manner. One method is to disperse liquid crystal oils in deionized water containing dissolved gelatin. Other water soluble binders such as polyvinyl alcohol (PVA) or polyethylene oxide (PEO) can be used. Such compounds are machine coatable on equipment associated with photographic films. FIG. 2 is a plot of the dispersions of domain size for a liquid crystal oil in aqueous suspension. The oil domains have a size distribution around a mean diameter. A certain number are above a certain diameter D, and are called oversized domains 31.

Figure 3A:
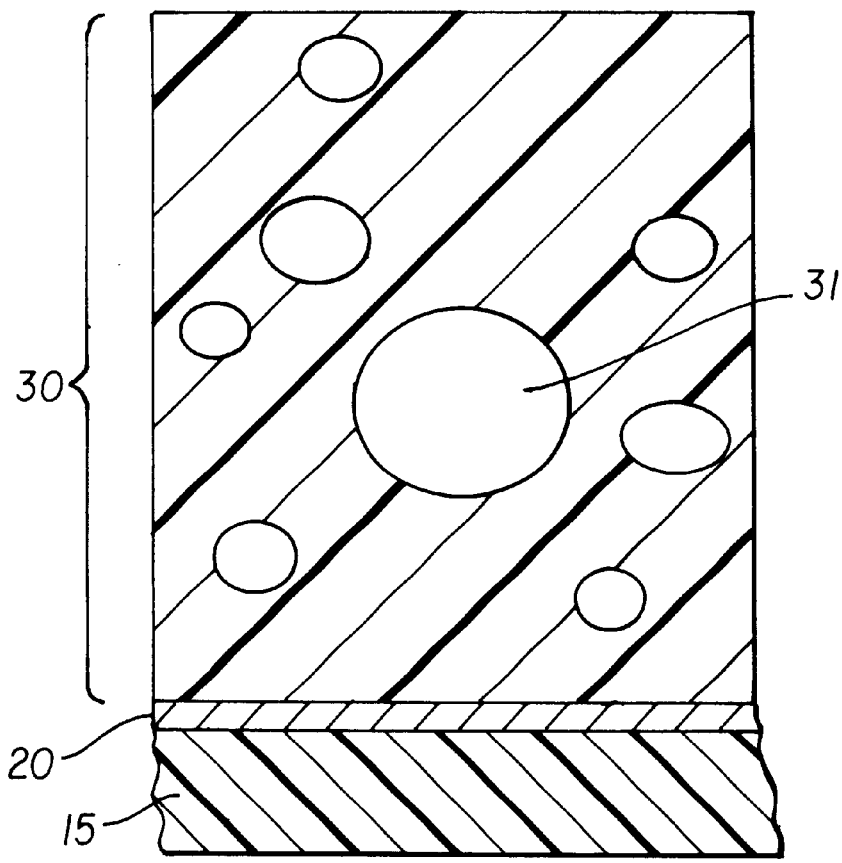
FIG. 3A is a sectional view a sheet having a coated emulsion before drying.
Figure 3B:
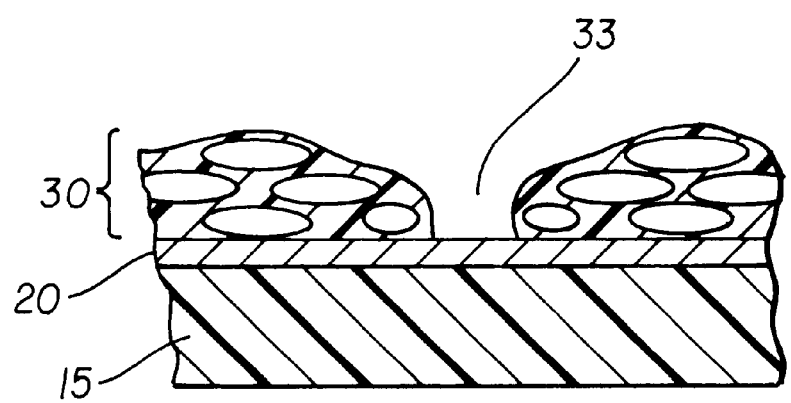
FIG. 3B is a sectional view of a sheet having a coated emulsion after drying.

FIG. 3A is a section view of a typical liquid crystal oil dispersed in water coated over first electrode 20 and containing oversized liquid crystal oil domains 31. Such coatings are dried to remove water from the suspension. FIG. 3B is a section view of the dried coating. The liquid crystal material is encapsulated by the water-soluble binder to create a pressure resistant light modulating layer 30. Oversize oil domains 31 can be significantly larger in diameter than the dry thickness of light modulating layer 30. Oversized oil domains 31 create coating defects 33 in the dried light modulating layer 30.

Figure 4A:
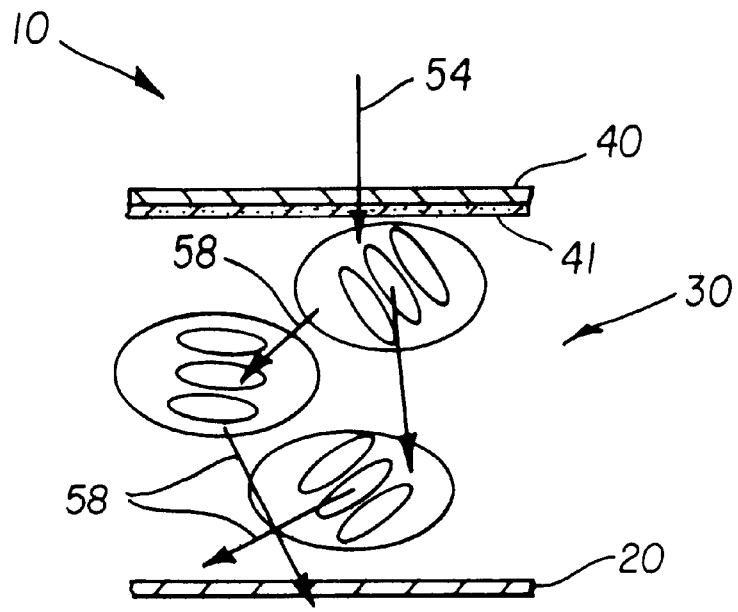
FIG. 4A is a sectional view of a nematic liquid crystal without an applied electric field.
Figure 4B:
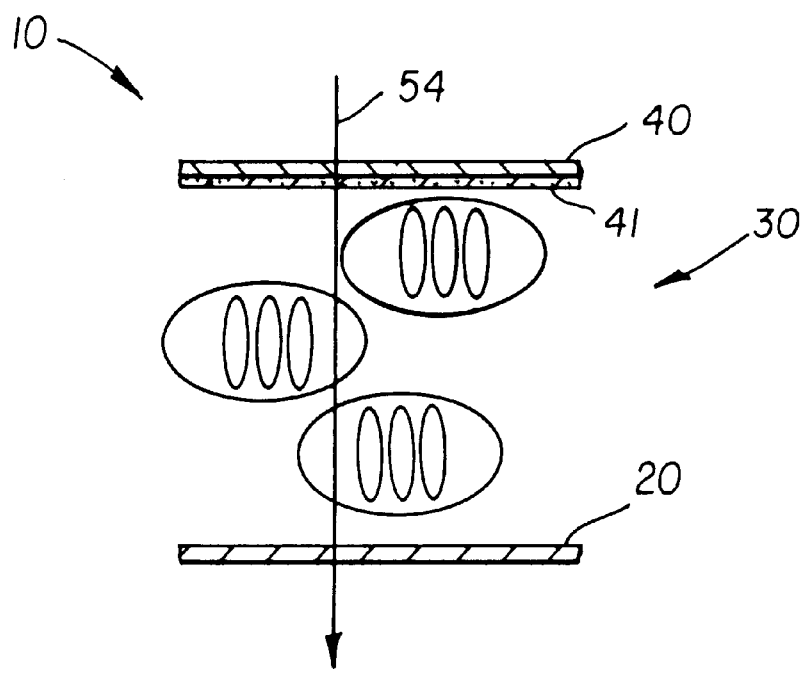
FIG. 4B is a sectional view of a nematic liquid crystal with an applied electric field.

FIG. 4A is a sectional view of a first, privacy screen light modulating layer 30, which is a nematic liquid crystal material having high optical anisotropy. It has been found that 2-micron diameter domains of the liquid crystal in aqueous suspension converts incident light 54 into scattered light 58 in the absence of an electric field. In this case, light modulating layer 30 within sheet 10 can be used as a privacy screen. The material is further provided with first electrode 20 and second electrode 40 having a dielectric adhesive layer 41 applied over the conductive surface and subsequently laminated to the light modulating layer 30 so that an electrical field can be applied across the material. FIG. 4B is a sectional view of light modulating layer 30 with an electrical field applied. Liquid crystal material within each domain is aligned by the electrical field, and sheet 10 will become transparent. Electrically switching between the light scattering and transparent state using an electric field provides an electrically switched privacy screen.

Figure 5A:
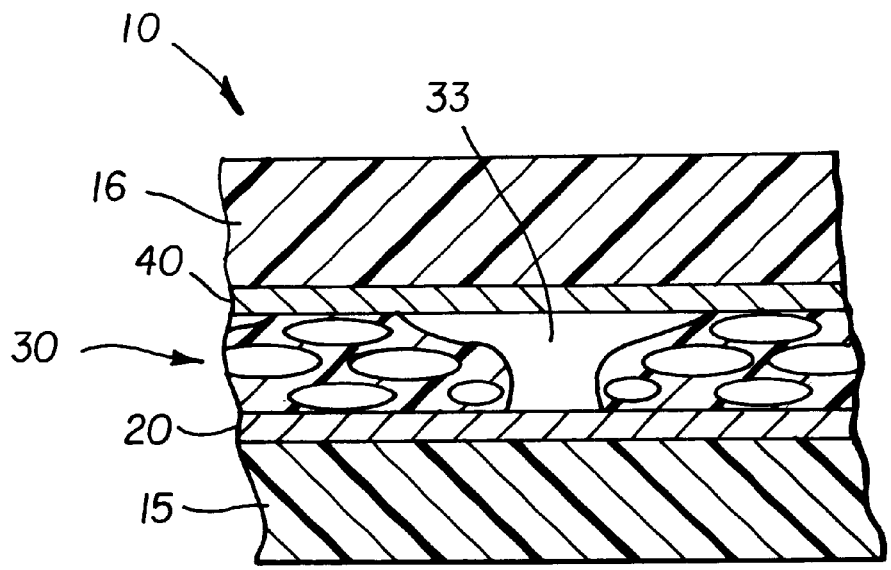
FIG. 5A is a display sheet having a laminated second conductor in accordance with prior art.

FIG. 5A is a sectional view of a privacy screen sheet 10 built in accordance with prior art. A second substrate 16, having second electrode 40 is bonded to a substrate 15 having a first electrode 20 and a light modulating layer 30. One method of bonding the two sheets of the privacy screens is to provide heat and pressure to bond second electrode 40 to light modulating layer 30. Coating defect 33 creates an air filled cavity in sheet 10. When sheets 10, formulated for privacy screen window application, are manufactured and a field is applied, liquid crystals in light modulating layer 30 begins to permanently align in the transparent state, even in the absence of a field.

Figure 5B:
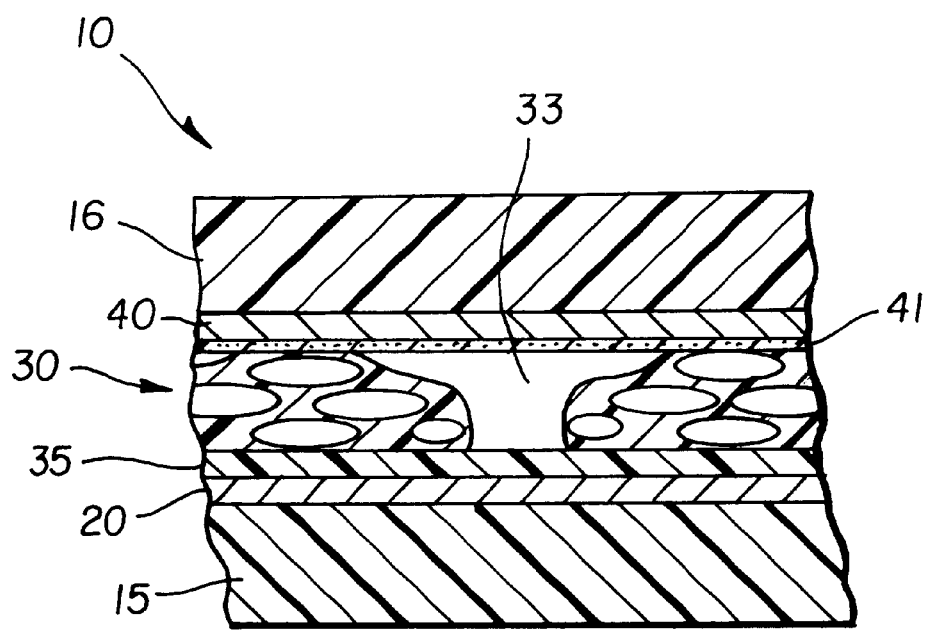
FIG. 5B is a display sheet having a laminated second conductor in accordance with this invention.

FIG. 5B is a sectional view of a sheet built in accordance with the current invention. A protective layer 35 is aqueous coated over first electrode 20 with aqueous dispersed material which when dried provides a protective dielectric layer over the first electrode 20. The protective layer 35 was created by coating a 1.3% deionized gelatin solution at a rate of 0.38 cc per square meter. The resulting coating was about 0.5 microns thick. An emulsion of high anisotropy liquid crystal in a gel-water solution was coated over an ITO coated sheet of polyester. A second polyester substrate 16, also having an ITO coated surface 40 and the dielectric adhesive layer 41 was prepared by coating an adhesive solution containing 5–10% solids at a wet coverage of 24 grams per square meter. The resulting layer is 1.2 to 2.4 microns thick after drying. The dried adhesive layer is subsequently heat bonded to the dried light modulating layer 30 using an interfacial temperature of 70–100° C. and moderate pressure. The resultant laminated structure is durable, having a bond separation resistance (peel strength) of 35–85 N/m, which can exceed the cohesive integrity of the light-modulating layer. Additionally, the liquid crystal material in experimental sheet 10 did not begin to align in the direction of the electrical field after several weeks of application of an electrical field. It is believed that the gelatin and adhesive dielectric layers act to prevent alignment of the liquid crystal material with the gelatin encapsulated domain.

Figure 6A:
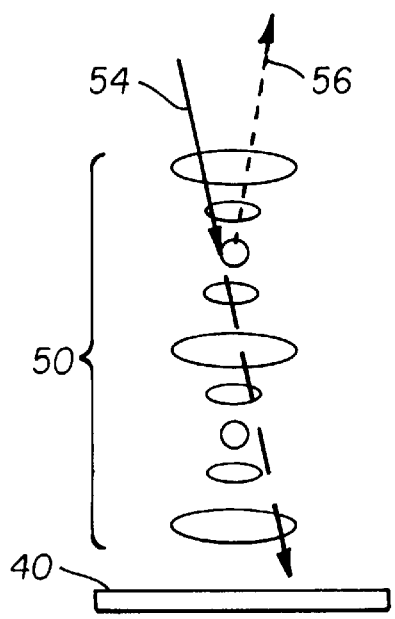
FIG. 6A is a view of the optical characteristics of a chiral nematic material in a planar state reflecting light.
Figure 6B:
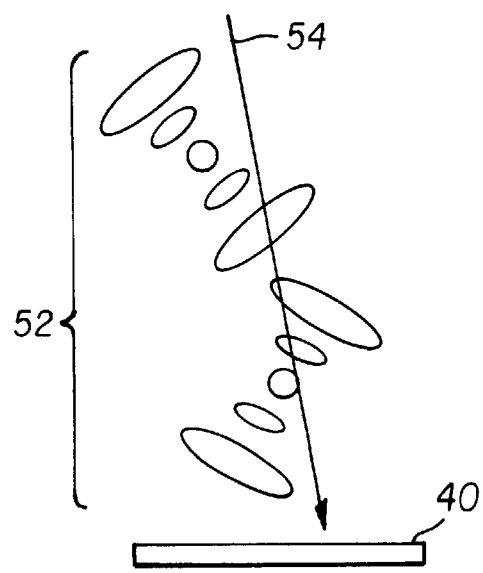
FIG. 6B is a view of the optical characteristics of a chiral nematic material in a focal-conic light diffusing state.

FIG. 6A and FIG. 6B show two stable states of cholesteric liquid crystals. In FIG. 6A, a high voltage field has been applied and quickly switched to zero potential, which converts cholesteric liquid crystal to a planar state 50. Incident light 54 striking cholesteric liquid crystal in planar state 50 is reflected as reflected light 56 to create a bright image. In FIG. 6B, application of a lower voltage field pulse leaves cholesteric liquid crystals in a transparent focal conic state 52. Incident light 54 passing through a cholesteric liquid crystal in focal conic state 52 is transmitted. Second patterned electrodes 40 can be black which will absorb incident light 26 to create a dark image when the liquid crystal material is in focal conic state 24. As a result, a viewer perceives a bright or dark image depending on if the cholesteric material is in planar state 22 or focal conic state 24, respectively.

Figure 7:
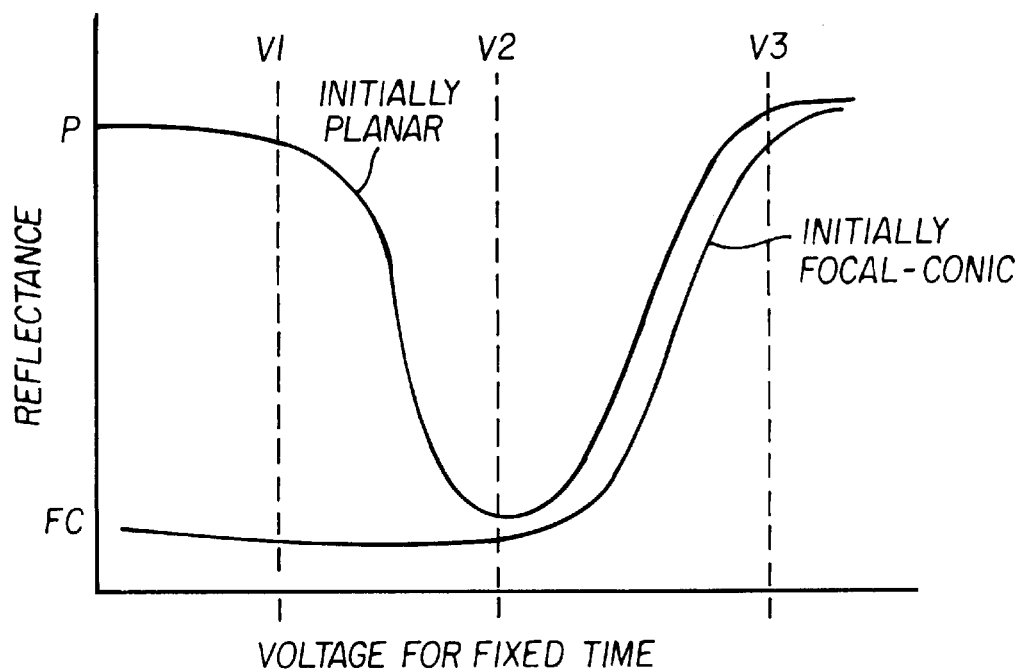
FIG. 7 is a plot of the response of a cholesteric to an electrical field of varying strength.

FIG. 7 is a plot of the response of a cholesteric material to a pulsed electrical field. Such curves can be found in U.S. Pat. Nos. 5,453,863 and 5,695,682. For a given pulse time, typically between 5 and 200 milliseconds, a pulse at a given voltage can change the optical state of a cholesteric liquid crystal. Voltage below disturbance voltage V1 can be applied without changing the state of the cholesteric material. A higher voltage pulse at a focal-conic voltage V3 will force a cholesteric material into the focal conic state 52. A voltage pulse at planar voltage V4 will force the cholesteric material into the planar state 50. The curve characteristic of cholesteric liquid crystal permits passive matrix writing of cholesteric displays.

The invention has been described in detail with particular reference to certain preferred embodiments thereof, but it will be understood that variations and modifications can be effected within the spirit and scope of the invention.

PARTS LIST 10 sheet
15 substrate
16 second substrate
20 first electrode
30 light modulating layer
31 oversized domains
33 coating defect
35 protective layer
40 second electrode
41 dielectric adhesive layer
50 planar liquid crystals
52 focal-conic liquid crystals
54 incident light
56 reflected light
58 scattered light
V1 disturbance voltage
V2 focal-conic voltage
V3 planar voltage

What is claimed is:
1. A method of making a liquid crystal display, comprising the steps of:
 (a) providing a first substrate;
 (b) providing a first electrode over the first substrate;
 (c) coating the first electrode with aqueous dispersed material which when dried provides a protective dielectric layer over the first electrode;
 (d) coating the dielectric layer with liquid crystal bearing material and drying such liquid crystal bearing material;
 (e) providing a second substrate;
 (f) providing a second electrode over the second substrate;
 (g) coating the second electrode with a dielectric adhesive material; and

(h) laminating the second electrode to the liquid crystal bearing material by means of the dielectric adhesive material.

2. The method of claim 1 wherein the dielectric adhesive material is a thermoplastic polyester.

3. The method of claim 1 wherein the dielectric adhesive material is a thermoplastic polyurethane.

4. The method of claim 1 wherein the dielectric adhesive material is a thermoplastic polyamide.

5. The method of claim 1 wherein the dielectric adhesive material is polyvinyl alcohol.

6. The method of claim 1 wherein the dielectric adhesive material is poly(butyl methacrylate).

7. The method of claim 1 wherein the dielectric adhesive material is polyvinyl butyral.

8. The method of claim 1 wherein the dielectric adhesive material is poly(acrylic acid).

9. The method of claim 1 wherein the dielectric adhesive material is poly(methyl vinyl ether/maleic anhydride).

10. The method of claim 1 wherein the dielectric adhesive material is a styrene/butadiene copolymer.

11. The method of claim 1 wherein the dielectric adhesive material is a styrene/acrylic copolymer.

* * * * *